US012005699B2

(12) United States Patent
Hosokawa et al.

(10) Patent No.: US 12,005,699 B2
(45) Date of Patent: Jun. 11, 2024

(54) RECORDING DEVICE

(71) Applicant: Seiko Epson Corporation, Tokyo (JP)

(72) Inventors: Tatsuya Hosokawa, Matsumoto (JP); Shintaro Komuro, Matsumoto (JP); Shota Sakagami, Matsumoto (JP); Hiroyuki Maeda, Matsumoto (JP); Takamasa Ikagawa, Matsumoto (JP); Koji Hara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 17/549,266

(22) Filed: Dec. 13, 2021

(65) Prior Publication Data

US 2022/0184974 A1 Jun. 16, 2022

(30) Foreign Application Priority Data

Dec. 16, 2020 (JP) ................................ 2020-208179

(51) Int. Cl.

*B41J 11/00* (2006.01)
*B41J 3/60* (2006.01)
*B41J 29/17* (2006.01)

(52) U.S. Cl.

CPC ............... *B41J 11/007* (2013.01); *B41J 3/60* (2013.01); *B41J 11/0095* (2013.01); *B41J 29/17* (2013.01)

(58) Field of Classification Search

CPC .... B41J 2/16535; B41J 2/175; B41J 2/16538; B41J 2/16547; B41J 2/16541; B41J 2/16544; B41J 2/16511; B41J 2/16505; B41J 2/16523; B41J 2/16532; B41J 2002/1742; B41J 11/007; B41J 29/17

See application file for complete search history.

(56) References Cited

U.S. PATENT DOCUMENTS 6,035,154 A * 3/2000 Takahata ............. G03G 15/168 399/101
2016/0355037 A1* 12/2016 Yamaguchi ............. B41J 13/12

FOREIGN PATENT DOCUMENTS

JP 2007076863 A * 3/2007 ............ B41J 11/007
JP 2014-160135 9/2014

* cited by examiner

*Primary Examiner* — Jannelle M Lebron
(74) *Attorney, Agent, or Firm* — WORKMAN NYDEGGER

(57) ABSTRACT

A recording device includes a recording unit configured to perform recording to a medium, a conveyance belt disposed facing the recording unit and configured to convey the medium, a first blade and a second blade configured to make contact with the conveyance belt and scrape out a residual of the conveyance belt, and a switching mechanism configured to switch the first blade and the second blade. When the first blade is moved to a first position where the first blade makes contact with the conveyance belt, the control unit moves the second blade to a second position where the second blade is separated from the conveyance belt, and when the second blade is moved to the first position where the second blade makes contact with the conveyance belt, the control unit moves the first blade to the second position where the first blade is separated from the conveyance belt.

9 Claims, 12 Drawing Sheets

RECORDING DEVICE

The present application is based on, and claims priority from JP Application Serial Number 2020-208179, filed Dec. 16, 2020, the disclosure of which is hereby incorporated by reference herein in its entirety.

BACKGROUND

1. Technical Field

The present disclosure relates to a recording device.

2. Related Art

In the related art, as disclosed in JP-A-2014-160135, an image forming device including a photoconductor drum configured to be rotated and a cleaning device configured to remove the residual remaining on the surface of the photoconductor drum is known. The cleaning device is provided with a cleaning blade that makes contact with the surface of the photoconductor drum.

However, in the above-mentioned image forming device, the cleaning blade makes contact with the surface of the photoconductor drum at all times, and consequently, when the removed residual is solidified at the end portion of the cleaning blade, the surface of the photoconductor drum is scratched and damaged due to the solidified material interposed between the cleaning blade and the photoconductor drum.

SUMMARY

A recording device includes a recording unit configured to perform recording by discharging a droplet to a medium, a conveyance belt disposed facing the recording unit and configured to convey the medium, a cleaning unit configured to scrape out a residual of the conveyance belt, and including a first blade and a second blade configured to make contact with the conveyance belt and scrape out the residual of the conveyance belt, and a switching mechanism configured to switch the first blade and the second blade, and a control unit. When the first blade is moved to a first position where the first blade makes contact with the conveyance belt, the control unit moves the second blade to a second position where the second blade is separated from the conveyance belt, and when the second blade is moved to the first position where the second blade makes contact with the conveyance belt, the control unit moves the first blade to the second position where the first blade is separated from the conveyance belt.

A recording device includes a recording unit configured to perform recording by discharging a droplet to a medium, a conveyance belt disposed facing the recording unit and configured to convey the medium, a blade configured to make contact with the conveyance belt and scrape out a residual of the conveyance belt, a housing case configured to house the blade, and a slide mechanism configured to slide the blade to a first position where an end portion of the blade protrudes from an opening provided in the housing case to make contact with the conveyance belt and a second position where the end portion of the blade is housed in the housing case. An inner wall surface of the housing case and a surface of the blade make close contact with each other.

DESCRIPTION OF EXEMPLARY EMBODIMENTS

1. First Embodiment

First, a configuration of a recording device 1 is described. The recording device 1 of this example is, for example, an ink-jet printer.

In each drawing, the direction along the X axis is the depth direction of the recording device 1, the direction along the Y axis is the width direction of the recording device 1, and the direction along the Z axis is the height direction of the recording device 1. In this embodiment, the −X direction side of the recording device 1 is the device front side, and the +X direction side is the device back side.

Figure 1:
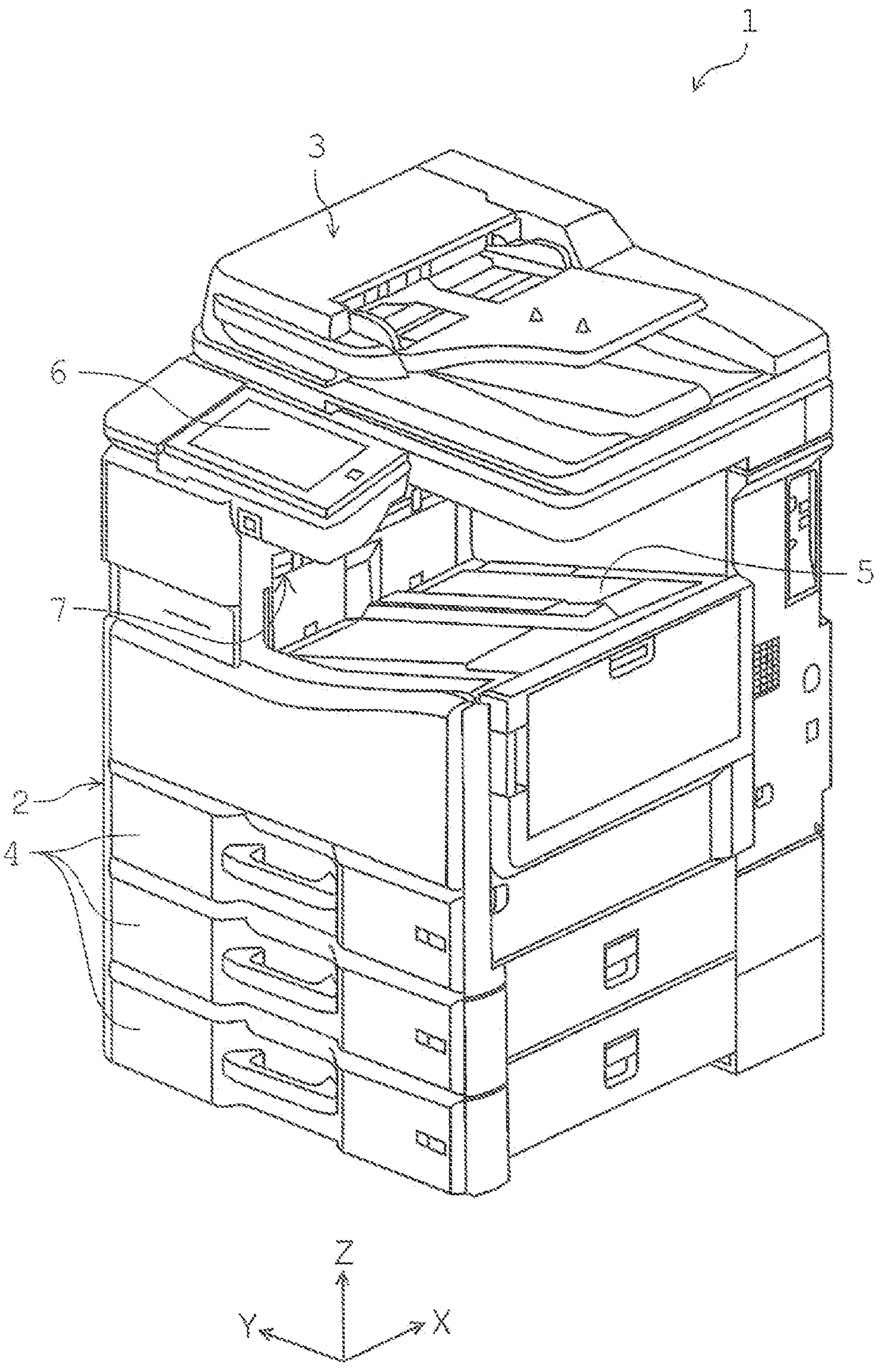
FIG. 1 is a perspective view illustrating a configuration of a recording device according to a first embodiment.

As illustrated in FIG. 1, the recording device 1 of this embodiment is configured as a multifunctional device including a device main body 2 and a scanner unit 3. The device main body 2 includes a plurality of medium housing cassettes 4 that house a medium P. Each medium housing cassette 4 is detachably attached from the device front side of the device main body 2. The medium P is, for example, a sheet such as plain paper, thick paper, and a photograph sheet.

In the device height direction in the device main body 2, a sheet ejection unit 7 that ejects the medium P on which recording has been performed by a line head 9 (FIG. 2) serving as a recording unit that performs recording by discharging ink, which is an example of liquid, and a medium placing part 5 where the medium P ejected from the sheet ejection unit 7 is placed are provided between the scanner unit 3 and the medium housing cassette 4. In addition, an operation unit 6 is provided on the device front side of the device main body 2. The operation unit 6 is provided with a display member such as a liquid crystal panel. Instructions of a recording operation and an image reading operation can be input to the recording device 1 by operating the operation unit 6.

Next, a conveyance path 11 of the medium P in the recording device 1 is described.

Figure 2:
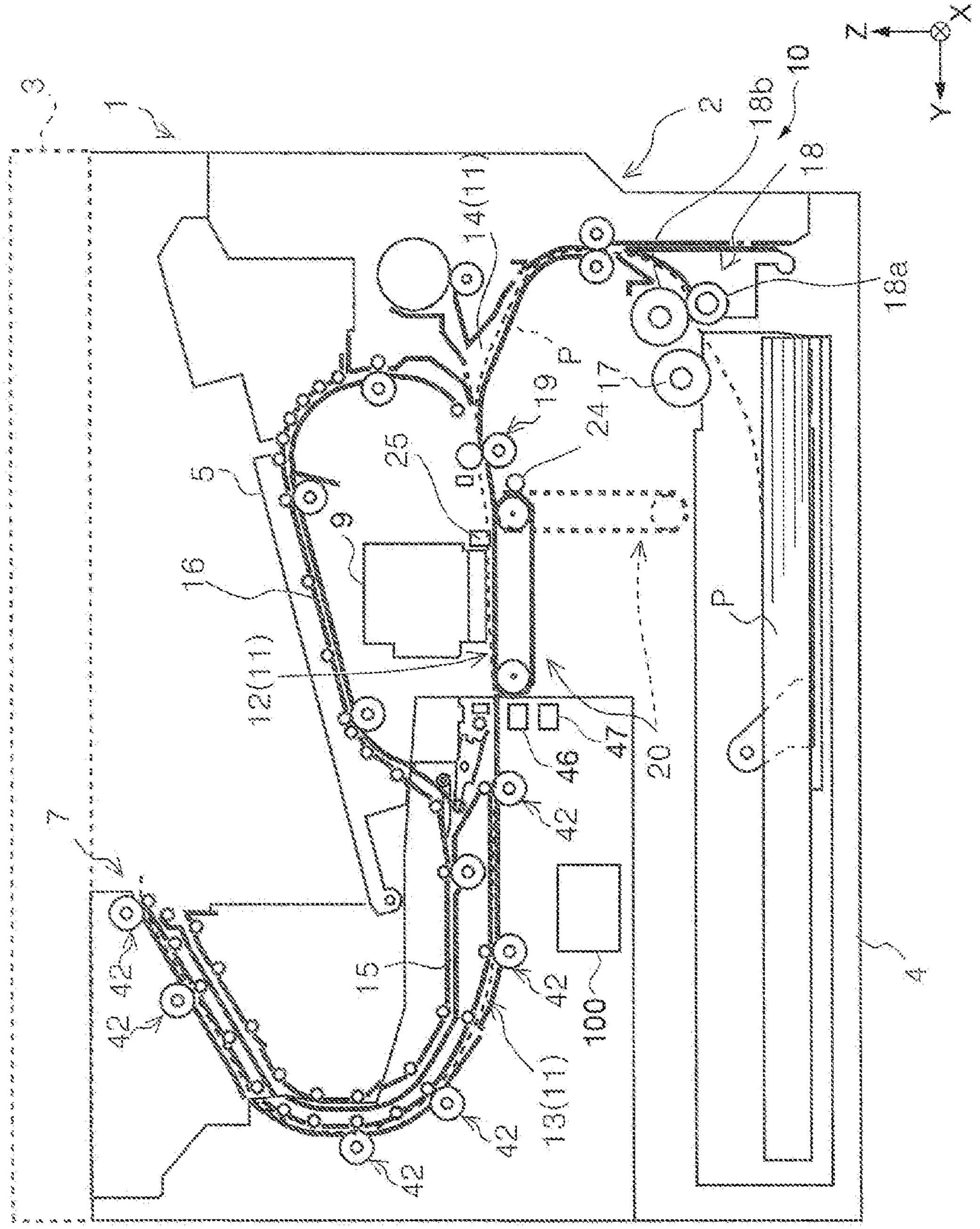
FIG. 2 is a schematic view illustrating an internal configuration of the recording device according to the first embodiment.

As illustrated in FIG. 2, the recording device 1 includes the conveyance path 11 of the medium P. The conveyance path 11 includes a feed path 14 that sends the medium P picked up from the medium housing cassette 4, a straight path 12 coupled to the feed path 14 and including a recording region A of the line head 9 (see FIG. 3), and a face-down ejection path 13 that sends the medium P from the straight path 12 to the sheet ejection unit 7. The medium P is conveyed along the conveyance path 11 by a medium conveyance unit 10 (a feed roller 17, a separation roller pair 18, a registration roller 19, a belt conveyance unit 20, and a conveyance roller pair 42).

Conveyance of the medium P from the medium housing cassette 4 to the sheet ejection unit 7 is described below. Note that the recording device 1 includes a switchback path 15 branched off from the straight path 12 on the downstream side of the line head 9, and an inversion path 16 coupled to the switchback path 15. The inversion path 16 inverts the first surface (front surface) and the second surface (rear surface) of the medium P and then returns the medium P to the straight path 12. The recording device 1 is configured to enable so-called double-sided recording in which after recording on the first surface of the medium P is performed, recording is performed on the second surface. The description of the inversion of the medium P at the switchback path 15 and the inversion path 16 is omitted.

At the feed path 14, the feed roller 17 and the separation roller pair 18 that separates a plurality of mediums P into single sheet are provided in this order along the conveyance direction of the medium P. The feed roller 17 is configured to be driven into rotation by a driving source not illustrated in the drawing. In addition, the separation roller pair 18 is also called retard roller, and includes a driving roller 18*a* that sends the medium P toward the straight path 12, and a driven roller 18*b* that separates the medium P by nipping the medium P together with the driving roller 18*a*.

Of the plurality of mediums P housed in the medium housing cassette 4, the topmost medium P is picked up by the feed roller 17 and conveyed downstream in the conveyance direction. At this time, the next and subsequent media P may also be conveyed together with the topmost medium P in some situation, but the topmost medium P and the next and subsequent media P are separated by the separation roller pair 18 such that only the topmost medium P is sent to the feed path 14.

The registration roller 19 is provided downstream of the separation roller pair 18 in the conveyance direction. The feed path 14 and the straight path 12 are coupled at the position of the registration roller 19. The straight path 12 is configured as a linearly extending path, and the registration roller 19, the belt conveyance unit 20, a static eliminator unit 25, and the line head 9 are provided at the straight path 12. The straight path 12 is a path extending through the recording region A of the line head 9 (FIG. 3) to the upstream side and downstream side of the line head 9.

In this embodiment, the belt conveyance unit 20 is disposed in a region facing the head surface of the line head 9, and supports the side opposite to the recording surface of the medium P.

When the medium P is conveyed at a position facing the line head 9 on the belt conveyance unit 20, the line head 9 performs recording by discharging ink as droplets to the recording surface of the medium P. The line head 9 is a recording head in which the nozzle that discharges ink is provided to cover the entire width of the medium P, and is capable of performing recording over the entire width direction of the medium P with no movement in the width direction of the medium P.

Note that while the recording device 1 of this embodiment includes the line head 9, it is also possible to adopt a serial recording head mounted in a carriage and configured to perform recording by discharging liquid to the medium P while moving back and forth in a direction intersecting the medium conveyance direction.

The medium P conveyed through the straight path 12 is then sent to the face-down ejection path 13. The face-down ejection path 13 is the conveyance path 11 with a curvature coupled to the straight path 12, and sends the medium P recorded by the line head 9 such that the medium P is ejected from the sheet ejection unit 7 with the recording surface side down.

The medium P having entered the face-down ejection path 13 is conveyed by a plurality of the conveyance roller pairs 42, ejected from the sheet ejection unit 7, and placed on the medium placing part 5 with the recording surface side down.

Figure 3:
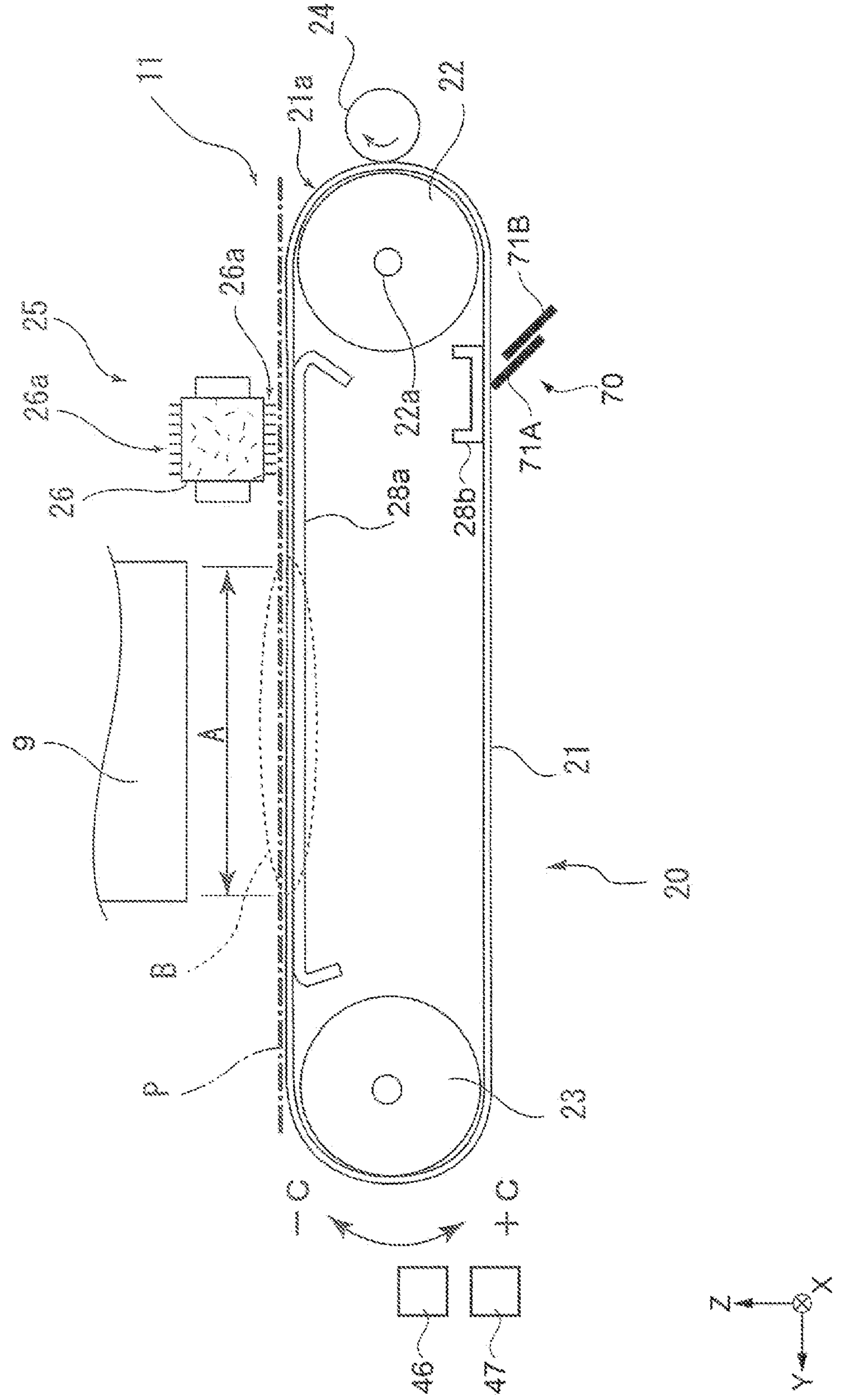
FIG. 3 is a schematic view illustrating a configuration of a belt conveyance unit and a cleaning unit according to the first embodiment.

As illustrated in FIG. 3, the belt conveyance unit 20 according to this embodiment includes an endless conveyance belt 21 that suctions the medium P to a belt outer surface 21*a*, an upstream driving roller 22 that is at least two rollers around which the conveyance belt 21 is provided, and a downstream driven roller 23 located downstream of the upstream driving roller 22 in the medium conveyance direction (the +Y-axis direction in FIG. 3). The conveyance belt 21 is disposed facing the head surface of the line head 9.

The belt conveyance unit 20 conveys the medium P downstream in the medium conveyance direction when the upstream driving roller 22 is driven into rotation by a driving source such as a motor and the conveyance belt 21 is driven. At this time, the downstream driven roller 23 is driven and rotated by the conveyance belt 21 that is driven by the rotational driving of the upstream driving roller 22. The upstream driving roller 22 is driven into rotation around a drive shaft 22*a*.

The driving source of the belt conveyance unit 20 is configured to enable forward and reverse rotation so as to circumferentially move the conveyance belt 21 in the forward direction, which is a direction in which the medium P is conveyed (the +C direction of the two-headed arrow illustrated in FIG. 3), and in the reverse direction (the −C direction of the two-headed arrow illustrated in FIG. 3), which is the opposite direction.

The belt conveyance unit 20 is configured to be switchable, by a state switching unit not illustrated in the drawing, between a first state where at least a part of the belt outer surface 21*a* is located at a recording position B of the line head 9, and a second state where the belt outer surface 21*a* is farther from the line head 9 than the recording position B (the dashed line in FIG. 2). The first state is a state where the recording on the medium P is performed by the line head 9. On the other hand, the second state is a state where the recording on the medium P by the line head 9 is not performed. At this time, to maintain the recording performance of the line head 9, the line head 9 in the non-recording state is covered from the −Z direction side with a cap not illustrated in the drawing, for example.

The recording device 1 includes a cleaning unit 70 that cleans the conveyance belt 21. The cleaning unit 70 includes a first blade 71A and a second blade 71B that sweep the belt outer surface 21*a* by making contact with the belt outer surface 21*a*. The first and second blades 71A and 71B have a plate-shape, and are formed of polyethylene terephthalate (PET). Below the conveyance belt 21, the first and second blades 71A and 71B are disposed upstream of a charging roller 24 in the movement direction of the conveyance belt 21. The first and second blades 71A and 71B are disposed in parallel such that one end side disposed on the belt outer surface 21*a* side is disposed upstream of the other end side in the movement direction of the belt outer surface 21*a*, and the first and second blades 71A and 71B make contact with the belt outer surface 21*a* in a tilted manner with respect to the movement direction of the conveyance belt 21. The first and second blades 71A and 71B alternately make contact with the moving conveyance belt 21, and scrape out residuals (such as paper dust and ink) adhered on the belt outer surface 21*a*. In this manner, the residuals are removed from the belt outer surface 21*a*. The first and second blades 71A and 71B are disposed to intersect the conveyance direction of the medium P. The size of the first and second blades 71A and 71B in the direction along the X axis is equal to the size of the conveyance belt 21 in the direction along the X axis. In this manner, the first and second blades 71A and 71B can make contact with the belt outer surface 21*a* of the conveyance belt 21 in the entire width direction.

In this embodiment, the conveyance belt 21 is a belt that conveys the medium P by electrostatically attracting it on the belt outer surface 21*a*, and the belt conveyance unit 20 includes the charging roller 24 as an example of a charging unit that charges the conveyance belt 21, and the static eliminator unit 25 that eliminates the electric charge of the surface of the medium P conveyed by the conveyance belt 21.

The charging roller 24 is provided upstream of the static eliminator unit 25 in the movement direction of the conveyance belt 21, at a position facing the upstream driving roller 22 below the conveyance path 11, and the charging roller 24 makes contact with the belt outer surface 21*a*.

When the upstream driving roller 22 and the downstream driven roller 23 are rotated and the conveyance belt 21 is driven, the charged belt outer surface 21*a* after the contact with the charging roller 24 becomes a path formation surface that forms the conveyance path 11. Thus, suctioning of the medium P at the conveyance belt 21 that forms the conveyance path 11 can be increased, and the medium P can be more effectively suctioned to the conveyance belt 21.

The static eliminator unit 25 includes an endless static eliminator belt 26 that is provided over the width direction (the direction along the X axis) of the medium P and rotates in the width direction. The static eliminator belt 26 is provided with a brush 26*a* protruding on the outside, and a portion facing the medium P on the conveyance belt 21 moves in the direction along the X axis, which is the medium width direction. The brush 26*a* of the static eliminator belt 26 is pressed against the medium P, and thus the electric charge is removed from the surface of the medium P. The suctioning of the medium P to the conveyance belt 21 can be improved by eliminating the electric charge of the surface of the medium P.

In addition, the belt conveyance unit 20 includes a first backup plate 28*a* and a second backup plate 28*b* that support the conveyance belt 21 from the inner surface side between the upstream driving roller 22 and the downstream driven roller 23. The first backup plate 28*a* is disposed facing the static eliminator unit 25, and the second backup plate 28*b* is disposed facing the first and second blades 71A and 71B.

The recording device 1 includes a surface detection unit 46 that detects the surface state of the conveyance belt 21. The surface detection unit 46 is, for example, a reflection type sensor including a light emission unit and a light reception unit. The surface detection unit 46 emits light to the belt outer surface 21*a* of the conveyance belt 21 and receives the light reflected from the belt outer surface 21*a*. The adhesion state of the residual (paper dust) adhering on the belt outer surface 21*a* of the conveyance belt 21 can be determined based on the light reception amount detected by the surface detection unit 46, for example.

In addition, the recording device 1 includes a temperature/humidity detection unit 47 that detects the temperature and humidity around the conveyance belt 21. The temperature/humidity detection unit 47 is, for example, a temperature/humidity sensor. Whether the environment easily solidifies the residual adhered on the first and second blades 71A and 71B can be determined based on the detection of the temperature/humidity detection unit 47.

Next, a configuration of a control unit 100 of the recording device 1 is described.

Figure 4:
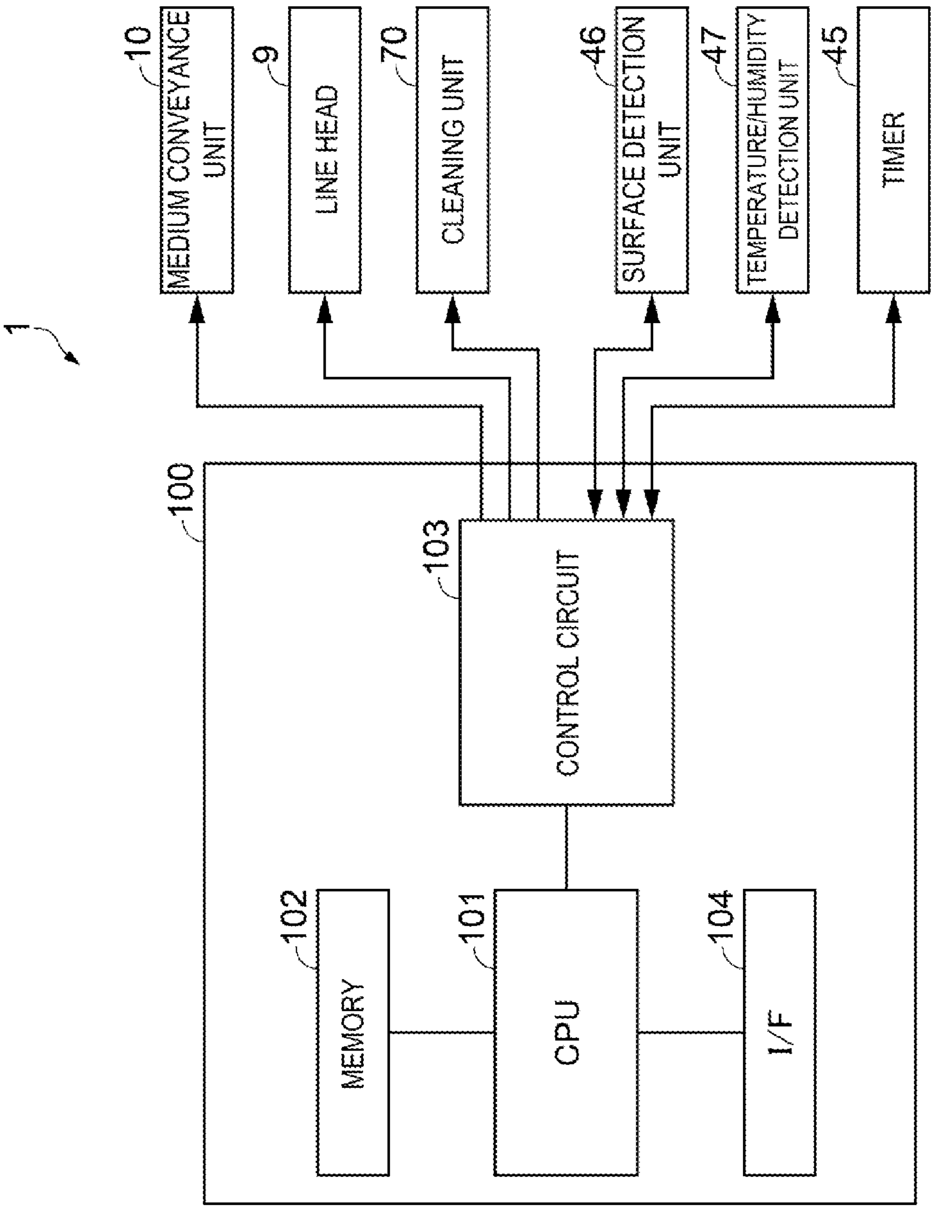
FIG. 4 is a block diagram illustrating a configuration of a control unit according to the first embodiment.

As illustrated in FIG. 4, the recording device 1 includes the control unit 100 that controls various operations executed at the recording device 1. The control unit 100 includes a CPU 101, a memory 102, a control circuit 103, and an I/F (interface) 104. The CPU 101 is a computation processing device. The memory 102 is a storage device that secures a region that stores the program of the CPU 101, a work area and the like, and includes a memory element such as a RAM and an EEPROM. When recording data or the like is acquired from an external device such as an information processing terminal through the I/F 104, the CPU 101 transmits a control signal to each driving unit through the control circuit 103. In this manner, the medium conveyance unit 10, the line head 9, the cleaning unit 70, a timer 45, the surface detection unit 46, the temperature/humidity detection unit 47 and the like are controlled.

Here, for example, in a case of a configuration in which a single blade makes contact with the conveyance belt 21 in the recording device 1, the blade scrapes out a residual such as paper dust adhered on the belt outer surface 21*a* of the conveyance belt 21, and thus the residual can be removed from the conveyance belt 21. However, if the time elapses in a state where the residual is accumulated at the end portion of the blade that makes contact with the conveyance belt 21, the residual solidifies. Then, if the solidified residual makes contact with the belt outer surface 21*a* of the conveyance belt 21, the conveyance belt 21 is damaged. The conveyance belt 21 of this embodiment is a belt that conveys the medium P by electrostatically attracting it, and therefore if the belt outer surface 21*a* of the conveyance belt 21 is damaged by the solidified residual, the insulation layer formed on the belt outer surface 21*a* is damaged, the charging function is reduced, and the conveyance failure of the medium P occurs.

In view of this, the recording device 1 of this embodiment is configured to suppress the damage of the conveyance belt 21. A detailed configuration is described below.

Figure 5A:
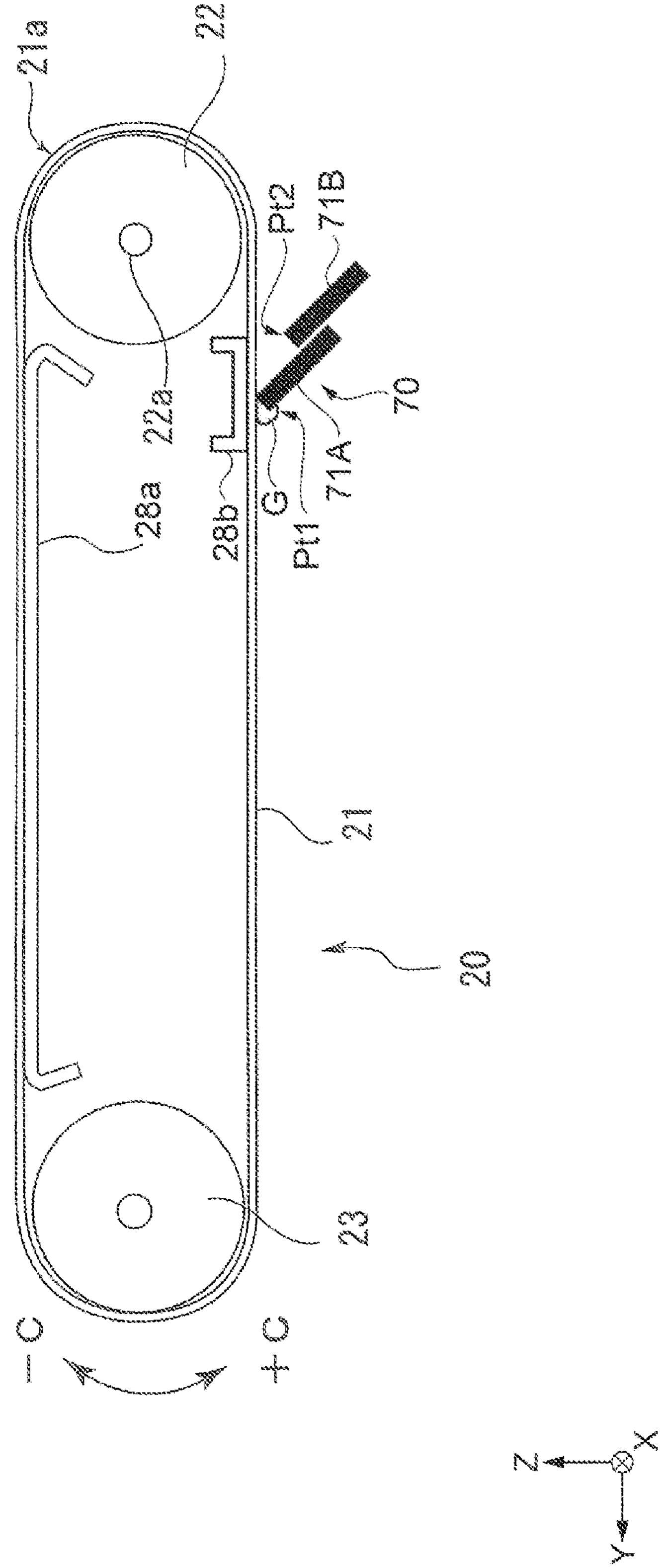
FIG. 5A is a schematic view illustrating a configuration of the cleaning unit according to the first embodiment.
Figure 5B:
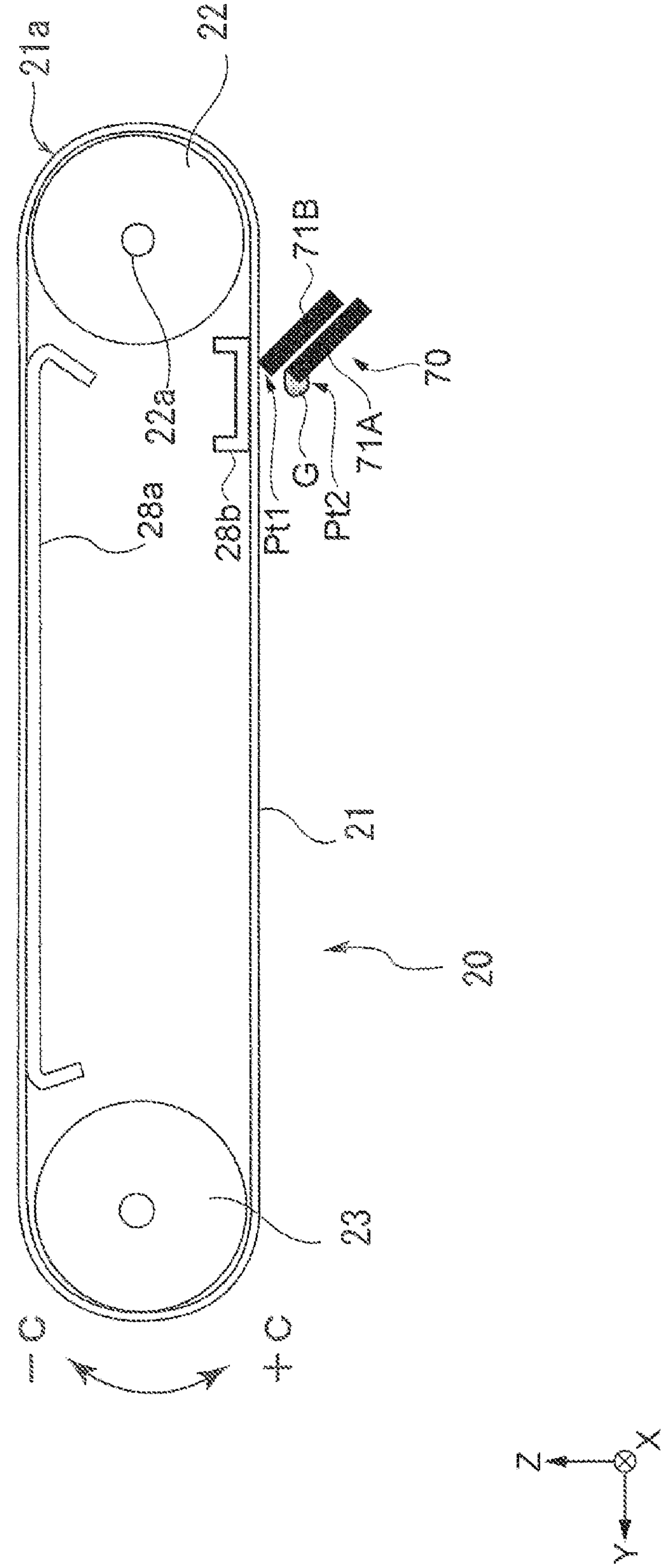
FIG. 5B is a schematic view illustrating a configuration of the cleaning unit according to the first embodiment.

As illustrated in FIG. 5A and FIG. 5B, the cleaning unit 70 of this embodiment includes the first blade 71A and the second blade 71B that make contact with the conveyance belt 21 and scrape out the residual of the conveyance belt 21. The first blade 71A and the second blade 71B are configured to be switchable by the switching mechanism.

The switching mechanism of this embodiment is composed of a slide mechanism that can slide the first blade 71A and the second blade 71B, and switches between a first position Pt1 where the blade makes contact with the conveyance belt 21 and a second position Pt2 where the blade is separated from the conveyance belt 21 by sliding the first blade 71A and the second blade 71B. The slide mechanism is composed of, for example, a cam, a solenoid and the like. In this manner, the contact and separation of the first blade 71A and the second blade 71B to and from the conveyance belt 21 can be readily performed.

Note that when the residual of the conveyance belt 21 is scraped out by the first blade 71A and the second blade 71B, the conveyance belt 21 is driven in the direction (the +C direction) in which the medium P is conveyed.

As illustrated in FIG. 5A, when the first blade 71A is moved to the first position Pt1 where it makes contact with the conveyance belt 21, the control unit 100 moves the second blade 71B to the second position Pt2 where it is separated from the conveyance belt 21. The first blade 71A makes contact with the conveyance belt 21, and a residual G scraped out from the conveyance belt 21 adheres to the end portion of the first blade 71A.

In addition, as illustrated in FIG. 5B, when the second blade 71B is moved to the first position Pt1 where it makes contact with the conveyance belt 21, the control unit 100 moves the first blade 71A to the second position Pt2 where it is separated from the conveyance belt 21.

Here, it is preferable that the control unit 100 switches the first blade 71A and the second blade 71B in accordance with a predetermined elapsed time by using the timer 45. For example, the first blade 71A is positioned at the first position Pt1 (FIG. 5A) until the time point of the elapse of a period obtained by equally dividing the period until implementation of the maintenance of the recording device 1, and thereafter, switching is performed to move the second blade 71B to the first position Pt1 (FIG. 5B). In this manner, the replacement from the first blade 71A to a new second blade 71B can be performed at an appropriate timing. In addition, switching to the second blade 71B can be performed before the residual G adhered to the end portion of the first blade 71A is solidified. In addition, since the first blade 71A and the second blade 71B are composed of the same material (PET), the same contact condition can be applied to the conveyance belt 21 even when the switching from the first blade 71A to the second blade 71B is performed.

In addition, in the recording device 1, the control unit 100 may change the contact pressure force of the first blade 71A or the second blade 71B against the conveyance belt 21 on the basis of the detection result of the surface detection unit 46.

For example, when it is determined that the belt outer surface 21*a* of the conveyance belt 21 has a surface state where the amount of the adhered residual G is relatively small, the contact pressure of the first blade 71A or the second blade 71B on the conveyance belt 21 is reduced. In this manner, the load applied to the conveyance belt 21 is reduced, and the lifetime of the conveyance belt 21 can be increased.

On the other hand, when it is determined that the belt outer surface 21*a* of the conveyance belt 21 has a surface state where the amount of the adhered residual G is relatively large, the contact pressure of the first blade 71A or the second blade 71B on the conveyance belt 21 is increased. In this manner, the load applied to the conveyance belt 21 increases, and the residual G adhered to the conveyance belt 21 can be easily removed.

In addition, in the recording device 1, the control unit 100 may switch the first blade 71A and the second blade 71B on the basis of the detection result of the temperature/humidity detection unit 47.

For example, in the case where the first blade 71A is located at the first position Pt1 in an environment (for example, an environment of high temperature and high humidity) where the residual G adhered to the end portion of the first blade 71A tends to be firmly fixed, it is switched to the second blade 71B at a predetermined timing. In this manner, the lifetime of the conveyance belt 21 can be increased.

As described above, according to this embodiment, the first blade 71A and the second blade 71B are configured to be switchable between the first position Pt1 and the second position Pt2, and thus the contact of each of the first and second blades 71A and 71B with the conveyance belt 21 can be reduced in comparison with a configuration in which a single blade makes contact with the conveyance belt 21 at all times. In this manner, the amount of the residual G that adheres to the first and second blades 71A and 71B is reduced, and the damage of the conveyance belt 21 due to the solidified residual G can be suppressed. Thus, the failure or the like of the conveyance belt 21 is reduced, and the lifetime of the conveyance belt 21 can be increased.

Note that while the cleaning unit 70 includes the two blades, the first blade 71A and the second blade 71B, in this embodiment, this configuration is not limitative, and three or more blades may be provided, for example.

2. Second Embodiment

Next, a second embodiment is described. Note that the same configurations as those of the first embodiment are denoted with the same reference numerals, and the overlapping description is omitted.

Figure 6A:
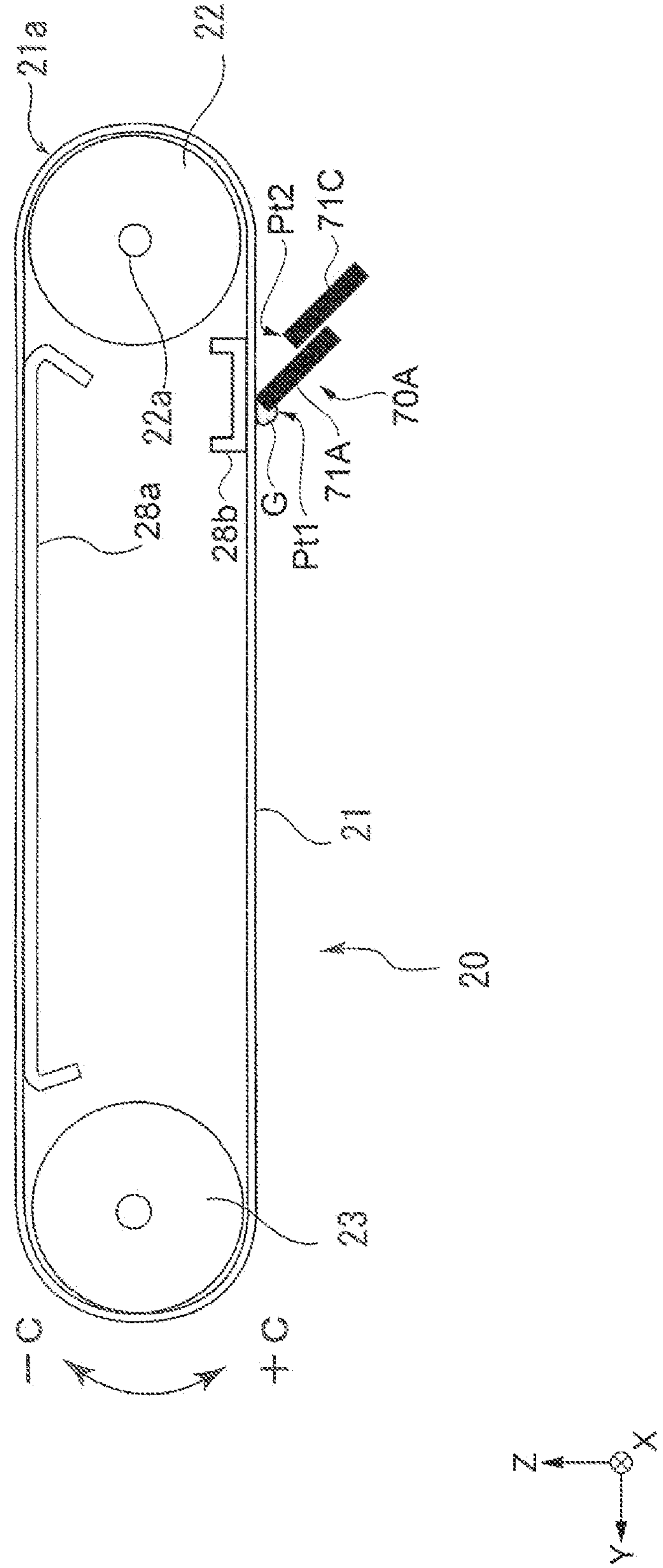
FIG. 6A is a schematic view illustrating a configuration of a cleaning unit according to a second embodiment.
Figure 6B:
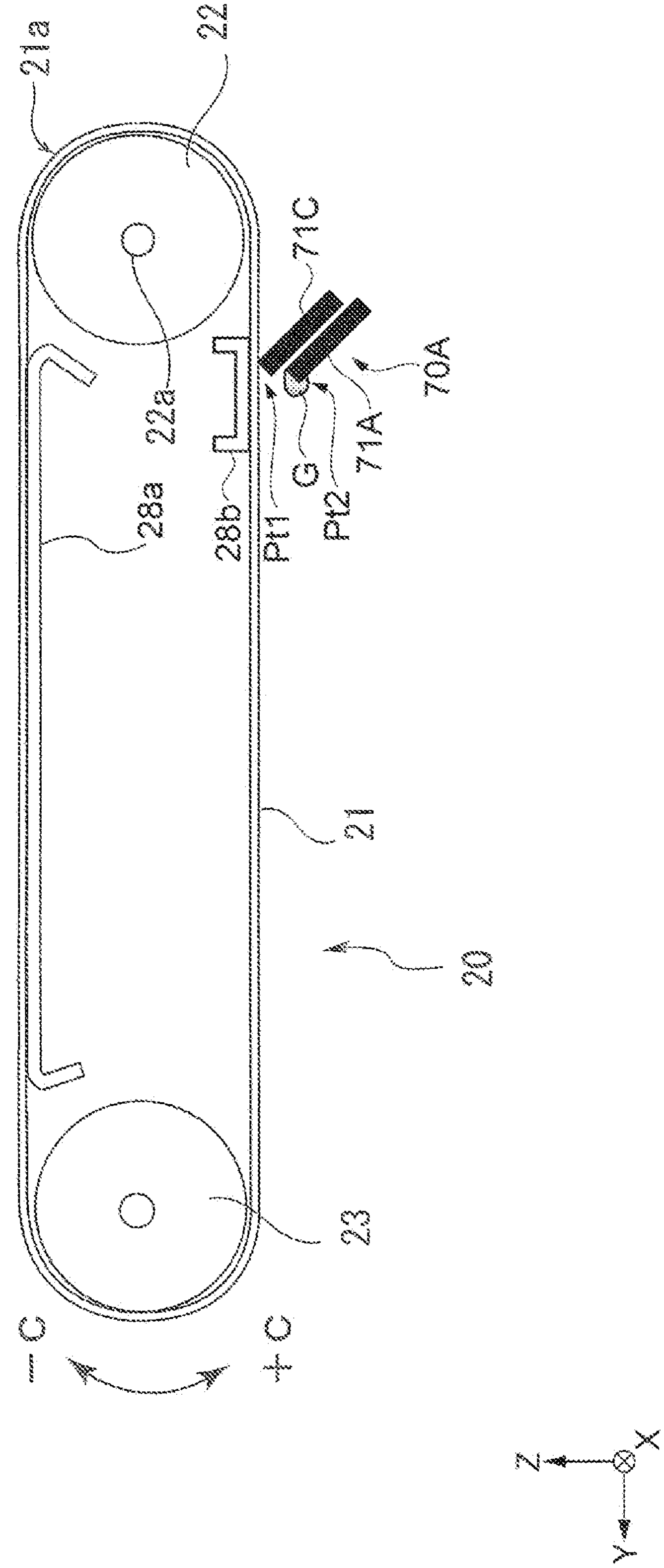
FIG. 6B is a schematic view illustrating a configuration of the cleaning unit according to the second embodiment.

As illustrated in FIG. 6A and FIG. 6B, a cleaning unit 70A of this embodiment includes the first blade 71A and a second blade 71C that make contact with the conveyance belt 21 and scrape out the residual of the conveyance belt 21. The first blade 71A and the second blade 71C are configured to be switchable by the switching mechanism.

The second blade 71C of this embodiment is made of a material having a higher rigidity than that of the first blade 71A. For example, the first blade 71A is made of PET, and the second blade 71C is made of stainless steel.

As illustrated in FIG. 6A, the control unit 100 moves the first blade 71A to the first position Pt1 where it makes contact with the conveyance belt 21, and moves the second blade 71C to the second position Pt2 where it is separated from the conveyance belt 21. The first blade 71A makes contact with the conveyance belt 21, and a residual G scraped out from the conveyance belt 21 adheres to the end portion of the first blade 71A.

Then, after a first predetermined time has elapsed, the control unit 100 moves the second blade 71B to the first position Pt1 where it makes contact with the conveyance belt 21, and moves the first blade 71A to the second position Pt2 where it is separated from the conveyance belt 21 as illustrated in FIG. 6B.

Thereafter, after a second predetermined time has elapsed, the control unit 100 moves the first blade 71A to the first position Pt1 where it makes contact with the conveyance belt 21, and moves the second blade 71C to the second position Pt2 where it is separated from the conveyance belt 21 as illustrated in FIG. 6A.

In this manner, for example, by switching to the second blade 71C with higher rigidity before the residual G adhered to the first blade 71A is solidified, a favorable state of the first blade 71A can be maintained, and the damage of the conveyance belt 21 can be suppressed.

In addition, when the blade is switched to the second blade 71C and the second blade 71C is brought into contact with the conveyance belt 21, the blade makes contact with the conveyance belt 21 with a stronger pressure, and thus the efficiency of scraping the residual G can be increased.

Note that the period of the second predetermined elapsed time is shorter than the period of the first predetermined elapsed time. In this manner, the damage of the conveyance belt 21 can be reduced, and the lifetime of the conveyance belt 21 can be increased.

Further, a favorable state of the first blade 71A is maintained and the damage (scratch) of the conveyance belt 21 is suppressed (FIG. 3) by performing a cleaning operation that powerfully removes the residual on the conveyance belt 21 by periodically separating the first blade 71A and bringing the second blade 71C with higher rigidity into contact with the conveyance belt 21 before the residual is firmly fixed and crystallized at the first blade 71A, while the first blade 71A normally makes contact with the conveyance belt 21 at all times.

3. Third Embodiment

Next, a third embodiment is described. Note that the same configurations as those of the first and second embodiments are denoted with the same reference numerals, and the overlapping description is omitted.

Figure 7A:
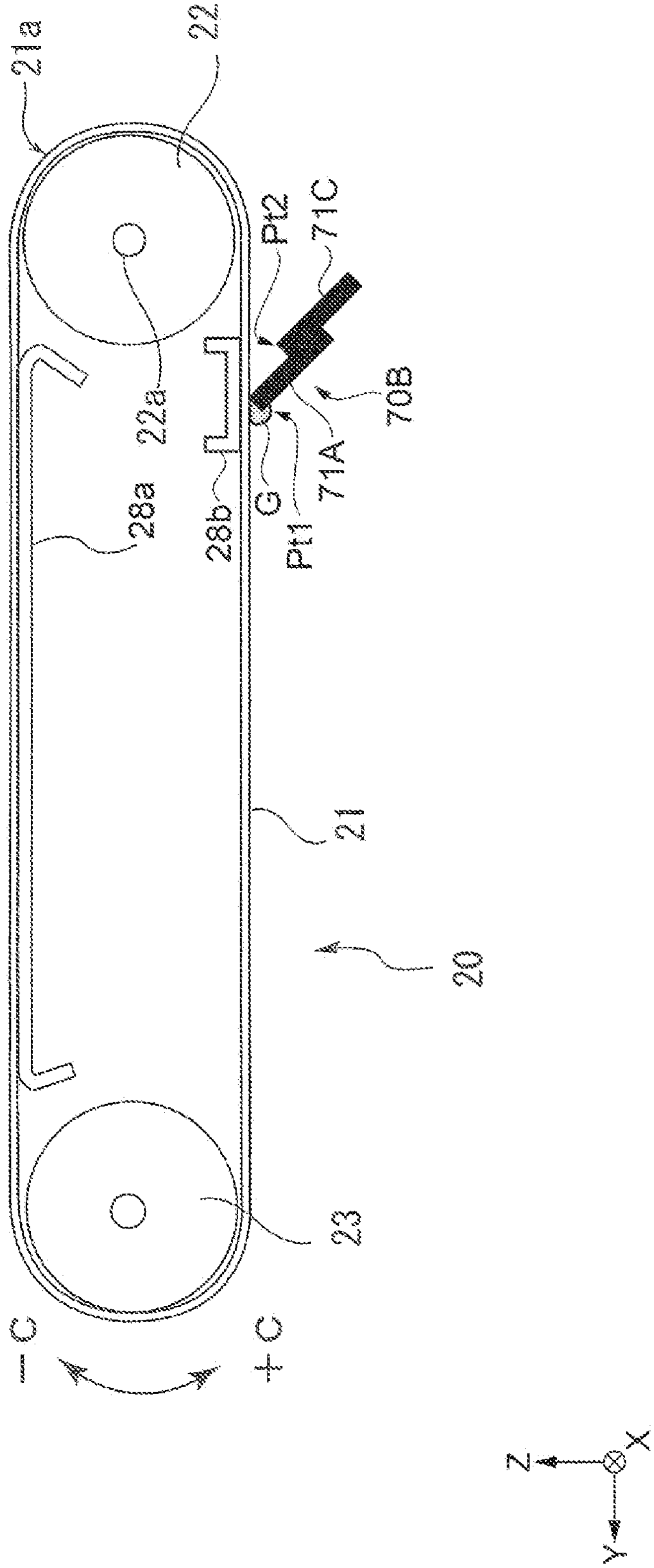
FIG. 7A is a schematic view illustrating a configuration of a cleaning unit according to a third embodiment.
Figure 7B:
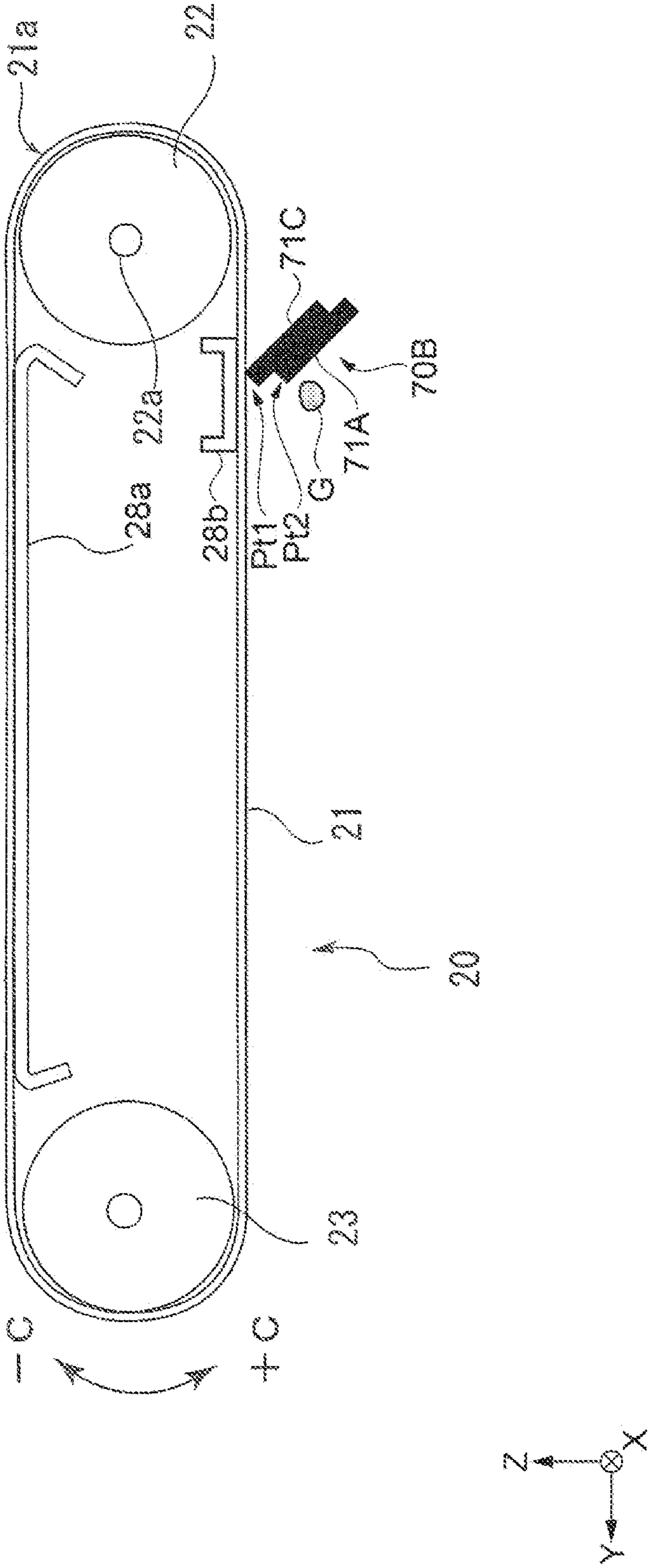
FIG. 7B is a schematic view illustrating a configuration of the cleaning unit according to the third embodiment.

As illustrated in FIG. 7A and FIG. 7B, a cleaning unit 70B of this embodiment includes the first blade 71A and the second blade 71C that make contact with the conveyance belt 21 and scrape out the residual of the conveyance belt 21. The first blade 71A and the second blade 71C are configured to be switchable by the switching mechanism.

In this embodiment, the first blade 71A and the second blade 71C are disposed in a state where they are in close contact with each other. More specifically, the surface of the first blade 71A on the −Y direction side and the surface of the second blade 71C on the +Y direction side are in close contact with each other.

The control unit 100 moves the first blade 71A to the first position Pt1 where it makes contact with the conveyance belt 21, and moves the second blade 71C to the second position Pt2 where it is separated from the conveyance belt 21 as illustrated in FIG. 7A. The first blade 71A makes contact with the conveyance belt 21, and a residual G scraped out from the conveyance belt 21 adheres to the end portion of the first blade 71A.

Then, after the first predetermined time has elapsed, the control unit 100 moves the second blade 71C to the first position Pt1 where it makes contact with the conveyance belt 21, and moves the first blade 71A to the second position Pt2 where it is separated from the conveyance belt 21 as illustrated in FIG. 7B. At this time, in a process of switching the first blade 71A and the second blade 71C, the end portion of the second blade 71C makes contact with the residual G adhered to the end portion of the first blade 71A. In this manner, the residual G is removed from the end portion of the first blade 71A.

Thereafter, after the second predetermined time has elapsed, the control unit 100 moves the first blade 71A to the first position Pt1 where it makes contact with the conveyance belt 21, and moves the second blade 71C to the second position Pt2 where it is separated from the conveyance belt 21. At this time, in the process of switching the first blade 71A and the second blade 71C, the end portion of the first blade 71A makes contact with the residual G adhered to the end portion of the second blade 71C. In this manner, the residual G is removed from the end portion of the second blade 71C.

As described above, according to the above-described embodiment, the residual G adhered to the first blade 71A or the second blade 71C is removed at a timing when the first blade 71A and the second blade 71C are switched, and thus the damage to the conveyance belt 21 can be suppressed. In this manner, the failure or the like of the conveyance belt 21 is reduced, and the lifetime of the conveyance belt 21 can be increased.

Note that while the cleaning unit 70B is composed of the first blade 71A made of PET and the second blade 71C made of stainless steel in this embodiment, this is not limitative. For example, as in the first embodiment, the first blade 71A and the second blade 71B may be made of the same material (PET). This also achieves the same effect as that described above.

4. Fourth Embodiment

Next, a fourth embodiment is described. Note that the same configurations as those of the first embodiment are denoted with the same reference numerals, and the overlapping description is omitted.

Figure 8A:
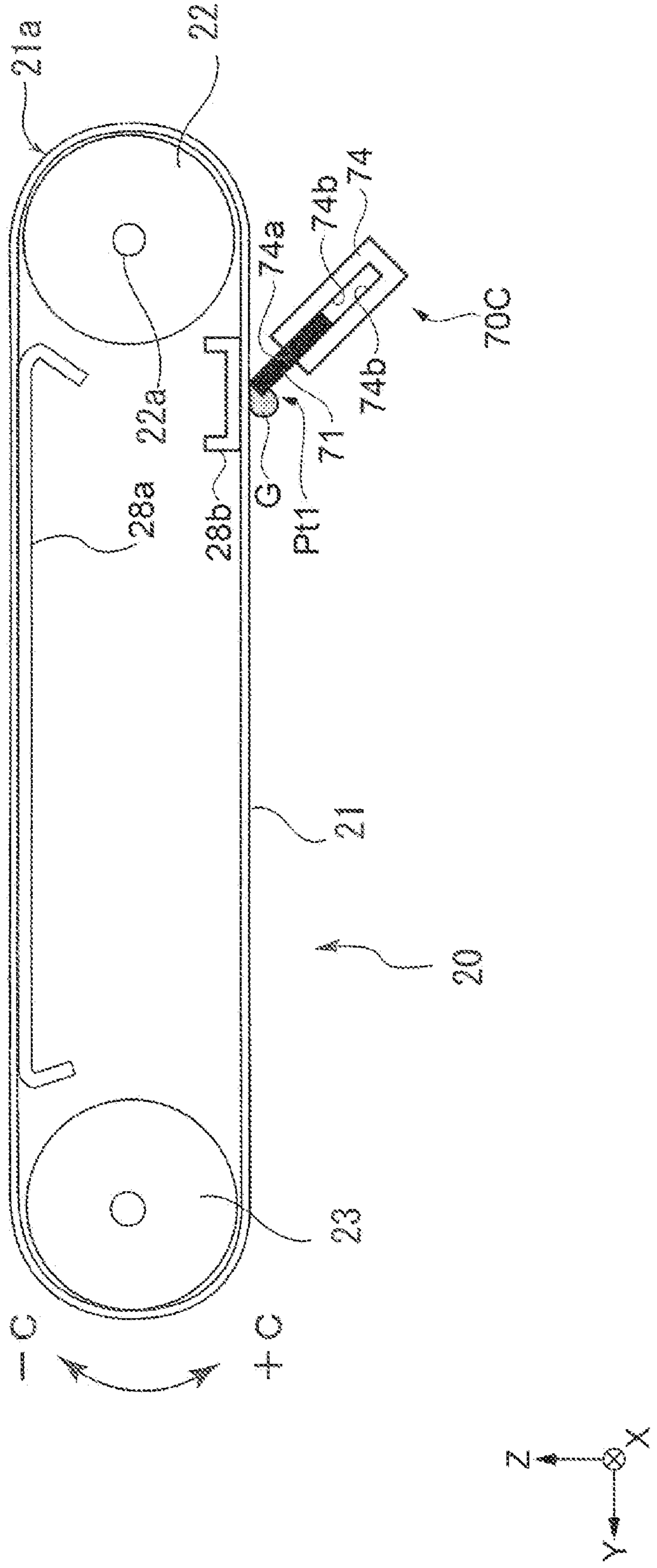
FIG. 8A is a schematic view illustrating a configuration of a cleaning unit according to a fourth embodiment.
Figure 8B:
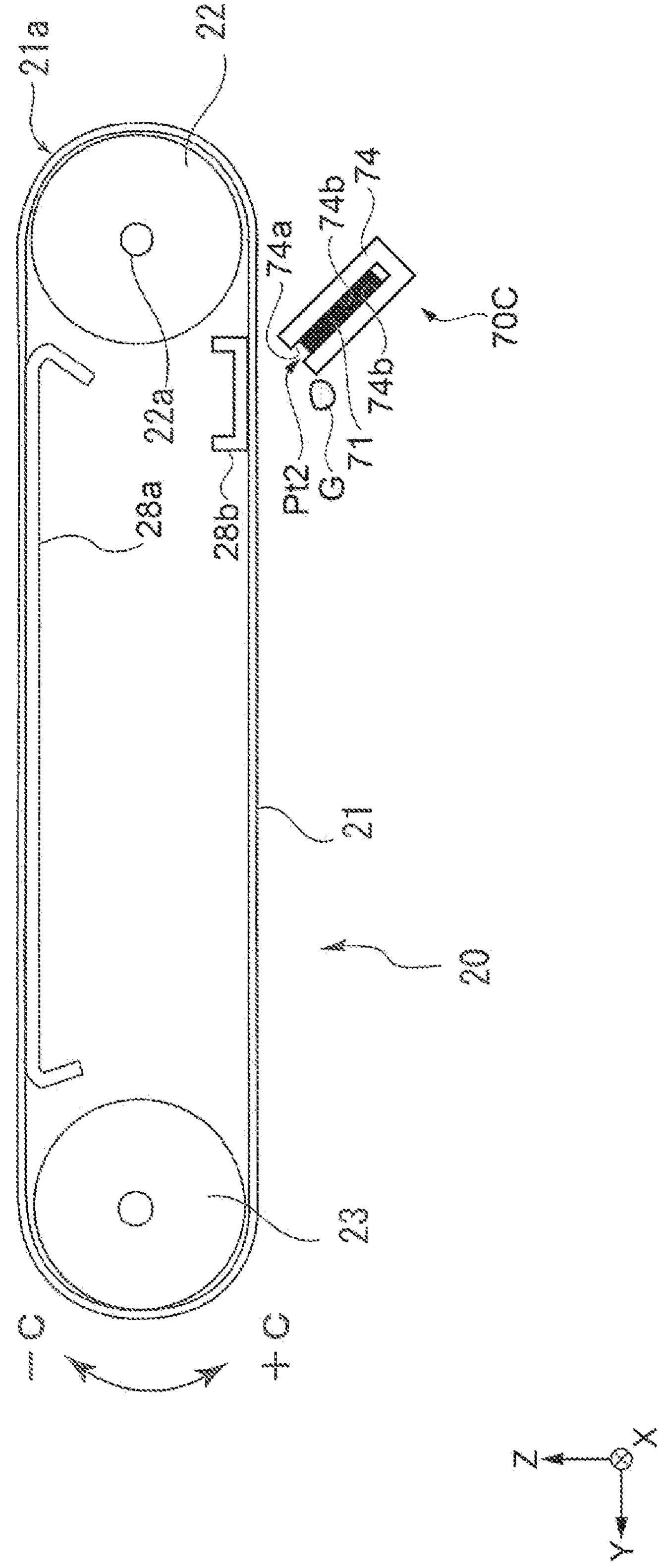
FIG. 8B is a schematic view illustrating a configuration of the cleaning unit according to the fourth embodiment.

As illustrated in FIG. 8A and FIG. 8B, a cleaning unit 70C of this embodiment includes a blade 71 that makes contact with the conveyance belt 21 and scrapes out the residual of the conveyance belt 21, a housing case 74 that houses the blade 71, and a slide mechanism that can slide the blade 71 to the first position Pt1 where the end portion of the blade 71 protrudes from an opening 74*a* provided in the housing case 74 and makes contact with the conveyance belt 21, and to the second position Pt2 where it is separated from the conveyance belt 21 and the end portion of the blade 71 is housed inside the housing case 74.

The blade 71 has the same configuration as that of the first the blade 71A of the first embodiment.

Further, in this embodiment, an inner wall surface 74*b* of the housing case 74 and the surface of the blade 71 make close contact with each other. More specifically, the surface on the +Y direction side and the surface on the −Y direction side of the blade 71, and the inner wall surface 74*b* of the housing case 74 that faces the surfaces make close contact with each other.

As illustrated in FIG. 8A, the control unit 100 moves the blade 71 to the first position Pt1 where it makes contact with the conveyance belt 21. The blade 71 makes contact with the conveyance belt 21, and the residual G scraped out from the conveyance belt 21 adheres to the end portion of the blade 71.

Then, when a predetermined time has elapsed, the control unit 100 moves the blade 71 to the second position Pt2 where it is separated from the conveyance belt 21 as illustrated in FIG. 8B. In this embodiment, it is moved until the end portion of the blade 71 is housed in the housing case 74. When the end portion of the blade 71 is housed in the housing case 74, the opening 74*a* of the housing case 74 and the inner wall surface 74*b* in the vicinity of the opening 74*a* make contact with the residual G adhered to the end portion of the blade 71. In this manner, the residual G is removed from the end portion of the blade 71.

As described above, according to the above-described embodiment, the residual G adhered to the blade 71 is removed at the timing of the switching of the blade 71 from the first position Pt1 to the second position Pt2, and thus the damage to the conveyance belt 21 can be suppressed. In this manner, the failure or the like of the conveyance belt 21 is reduced, and the lifetime of the conveyance belt 21 can be increased.

What is claimed is:

1. A recording device comprising:

a recording unit configured to perform recording by discharging a droplet to a medium;

a conveyance belt disposed facing the recording unit and configured to convey the medium;

a cleaning unit configured to scrape out a residual of the conveyance belt, and including a first blade and a second blade configured to make contact with the conveyance belt and scrape out the residual of the conveyance belt, and a switching mechanism configured to switch the first blade and the second blade; and a control unit, wherein after a first predetermined time has elapsed, the control unit moves the first blade to a first position where the first blade makes contact with the conveyance belt and moves the second blade to a second position where the second blade is separated from the conveyance belt, after a second predetermined time has elapsed, the control unit moves the second blade to the first position where the second blade makes contact with the conveyance belt and moves the first blade to the second position where the first blade is separated from the conveyance belt, and the first predetermine time and the second predetermined time are equal to each other and obtained by equally dividing a period until implementation of a maintenance of the recording unit.

2. The recording device according to claim 1, wherein the switching mechanism is a slide mechanism configured to slide the first blade and the second blade; and sliding of the first blade and the second blade switches the positions thereof between the first position and the second position.

3. The recording device according to claim 1, wherein the first blade and the second blade are made of the same material.

4. The recording device according to claim 1, wherein the second blade is made of a material with a higher rigidity than that of the first blade.

5. The recording device according to claim 4, wherein the control unit periodically separates the first blade from the conveyance belt, while bringing the second blade with the higher rigidity into contact with the conveyance belt.

6. The recording device according to claim 1, wherein the first blade and the second blade are disposed in a close contact state.

7. The recording device according to claim 1, wherein the control unit switches the first blade and the second blade in accordance with a predetermined elapsed time.

8. The recording device according to claim 1, comprising a surface detection unit configured to detect a surface state of the conveyance belt, wherein the control unit changes a contact pressure force of the first blade or the second blade against the conveyance belt on a basis of a detection result of the surface detection unit.

9. The recording device according to claim 1, comprising a temperature/humidity detection unit configured to detect a temperature and a humidity around the conveyance belt, wherein the control unit switches the first blade and the second blade on a basis of a detection result of the temperature/humidity detection unit.

* * * * *